United States Patent [19]

Takase et al.

[11] Patent Number: 5,271,005
[45] Date of Patent: Dec. 14, 1993

[54] METHOD OF MODIFYING VIRTUAL PATH CAPACITY

[75] Inventors: Akihiko Takase, Tokyo; Yukio Nakano, Hachioji, all of Japan

[73] Assignee: Hitachi, Ltd., Tokyo, Japan

[21] Appl. No.: 744,264

[22] Filed: Aug. 13, 1991

[30] Foreign Application Priority Data

Aug. 17, 1990 [JP] Japan .................. 2-215707

[51] Int. Cl.⁵ .............................................. H04J 3/16
[52] U.S. Cl. ...................................... 370/79; 370/95.1
[58] Field of Search ................ 370/53, 54, 58.1, 79, 370/84, 95.1, 110.1

[56] References Cited

U.S. PATENT DOCUMENTS

| | | | |
|---|---|---|---|
| 4,476,527 | 10/1984 | Clayton | 370/84 |
| 4,965,798 | 10/1990 | Mostafa | 370/79 |
| 5,038,340 | 8/1991 | Ochiai | 370/54 |
| 5,067,127 | 11/1991 | Ochiai | 370/95.1 |

Primary Examiner—Benedict V. Safourek
Attorney, Agent, or Firm—Antonelli, Terry, Stout & Kraus

[57] ABSTRACT

A method of modifying a virtual path capacity in a communication network which transfers a first cell in an asynchronous transfer mode between node apparatuses. The first cell has a first virtual path identifier indicative of a virtual path which the first cell passes through. A bandwidth allocated to the virtual path is modified. Notification of the modification of the bandwidth is provided to a node apparatus included in the virtual path by passing a second cell through said virtual path. The second cell has information of the modification and a second virtual path identifier same as the first virtual path identifier. The second cell is received by the node apparatus and a third cell having information of confirmation of reception of the second cell is returned by the node apparatus.

9 Claims, 6 Drawing Sheets

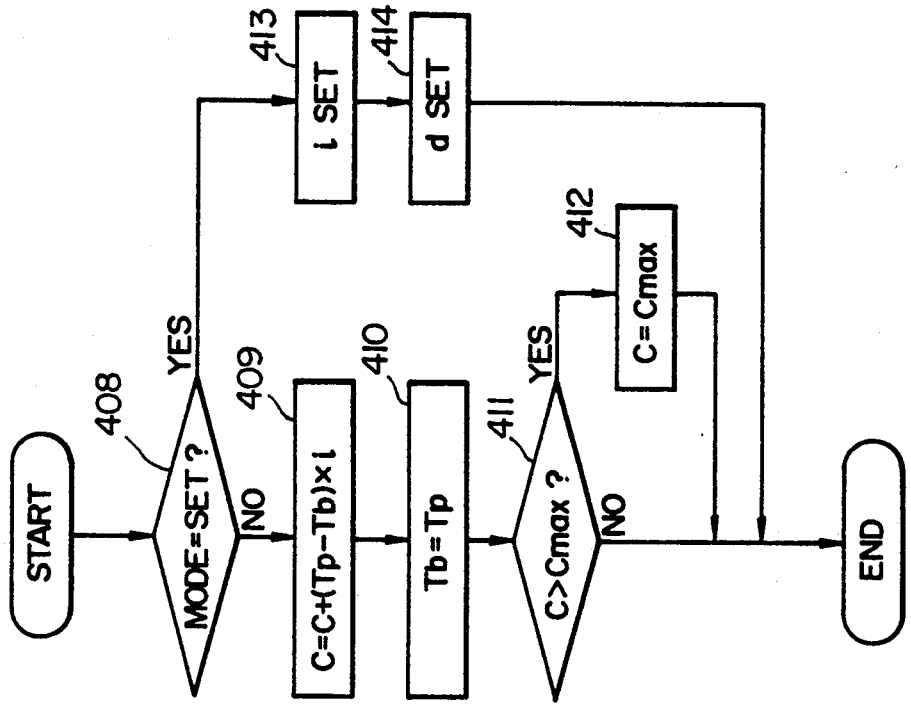
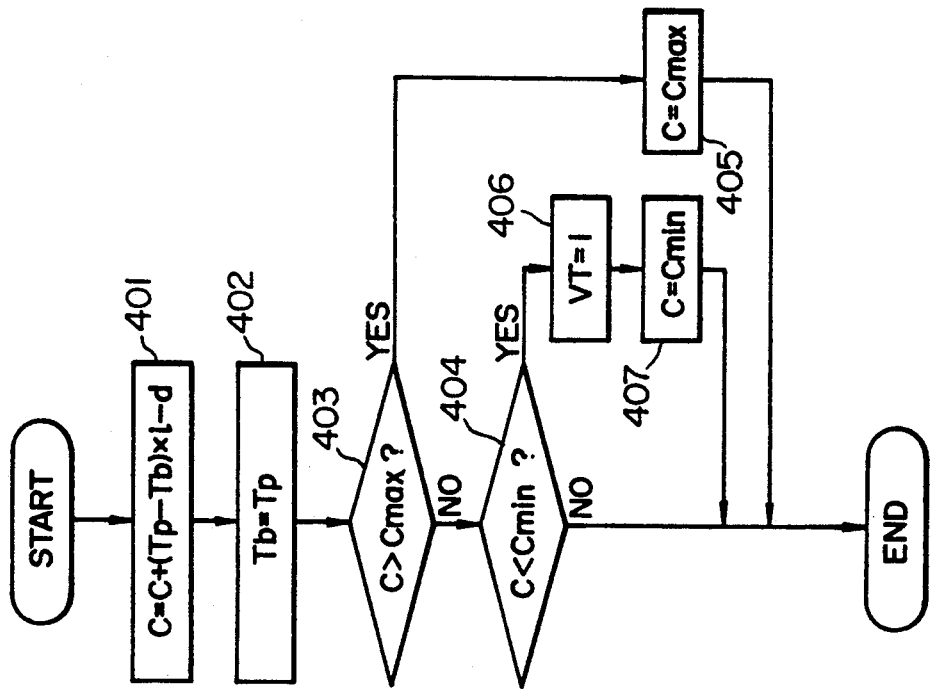

METHOD OF MODIFYING VIRTUAL PATH CAPACITY

BACKGROUND OF THE INVENTION

The present invention relates to a method of modifying a capacity of a logical path (a virtual path, hereinafter abbreviated as a VP) in a communication network in an asynchronous transfer mode (hereinafter abbreviated as ATM), and more particularly to a method of notifying a cross connect apparatus which changes over the virtual path in the unit of a cell of indication for modification in case of modifying the capacity of the virtual path.

In a communication network with a conventional synchronous transfer mode (hereinafter abbreviated as STM), change-over of a path has been performed by notifying all of cross connect nodes, where the path to be changed over passes through, of the change-over of the relevant path. Such notice is given by a separate control line from the path. It has been proposed that a similar method may be adopted in an ATM communication network using the STM communication network as an example. FIG. 2 shows such a method. A VP in an ATM is set between switching systems, and a VP management system usually executes modification of the VP capacity based on a VP capacity modification request from the switching system.

A switching system 20a issues a VP capacity modification request to a VP management system 10 when there is a need to modify a VP capacity to another switching system 20b. The VP management system 10 investigates a capacity of a transmission line and a VP capacity set status of a link where the VP passes through, issues admission of VP capacity modification to the switching system 20a and issues indication of modification of the VP capacity at the same time to cross connect systems 30a, 30b and 30c of the passing links if VP capacity modification is possible.

In above-described conventional example, it is required to issue indications of modification from the VP management system 10 through different lines to each of cross connect systems 30a, 30b and 30c, respectively. Since a VP is usually composed of approximately several ten links, it is required to issue indications of modification to several ten cross connects respectively.

SUMMARY OF THE INVENTION

It is an object of the present invention to reduce complexity of notifying a plurality of cross connects of capacity modification individually, and to realize equivalent functions by a more simplified method.

In order to solve the above-described problems, indications of VP capacity modification are given by sending out a cell for operation, administration and maintenance (hereinafter abbreviated as OAM) showing indications of VP capacity modification in the VP in a method according to the present invention.

It is generally possible to achieve the object only by notifying of the same information of a new capacity in a simulcast manner to all the cross connects in modifying the VP capacity. Further, respective cross connects are connected link by link, and it is possible to realize a simulcast function in such a case by relaying the same information link by link.

BRIEF DESCRIPTION OF THE DRAWINGS

FIGS. 4A and 4B are flow charts illustrating operation of a policing circuit according to the fundamental embodiment.

DESCRIPTION OF THE PREFERRED EMBODIMENTS

Figure 1:
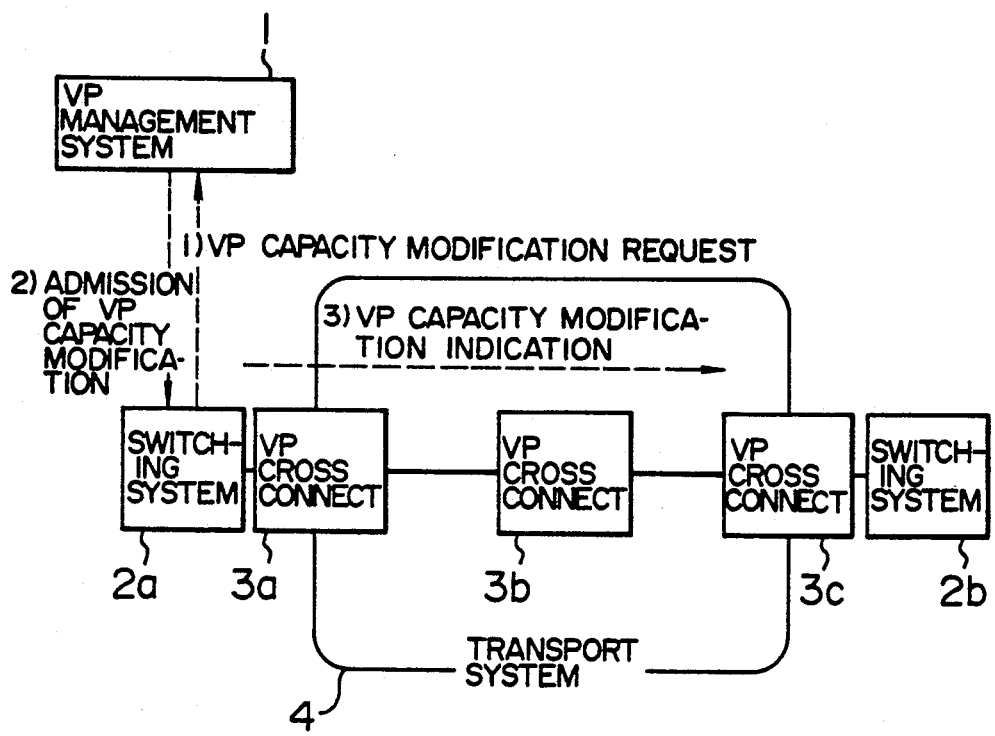
FIG. 1 is a block diagram for explaining a fundamental embodiment of the present invention.
Figure 2:
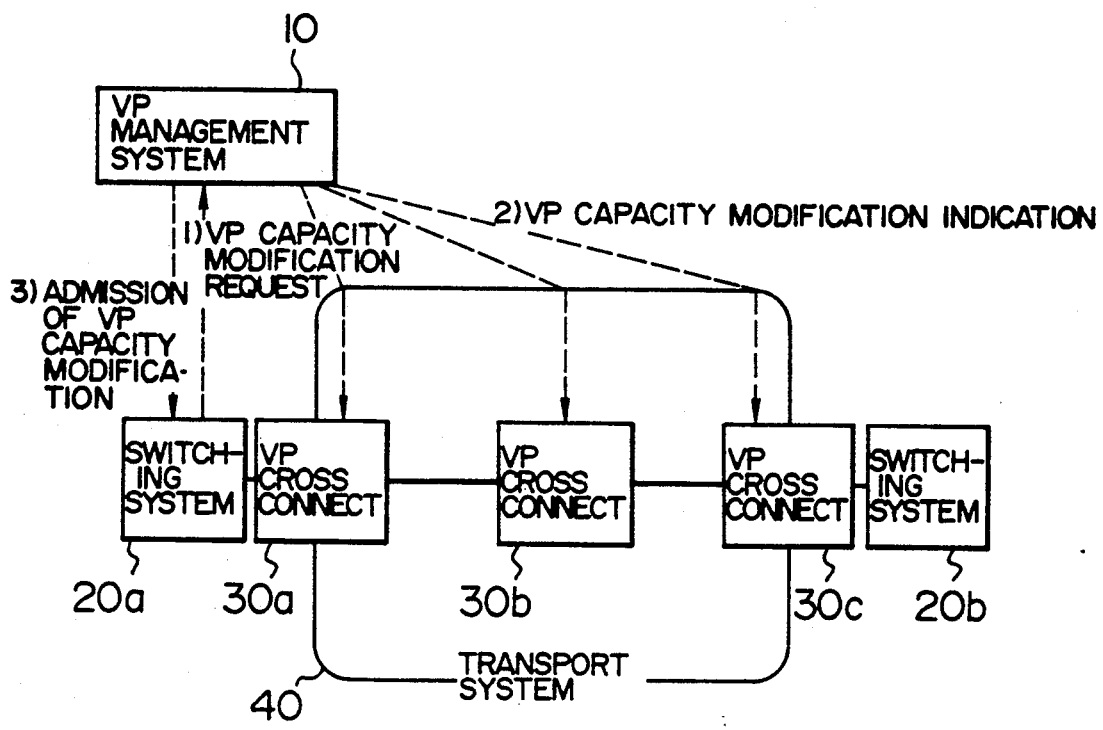
FIG. 2 is a block diagram showing a conventional example.

The embodiments of the present invention will be described hereinafter with reference to the drawings. FIG. 1 is a diagram showing a fundamental embodiment of the present invention.

A switching system 2a issues a VP capacity modification request to a VP management system 1 when there is a need to modify a VP capacity to another switching system 2b. The VP management system 1 investigates a capacity of a transmission line and a VP capacity set status of a link where the VP passes through, and issues admission of VP capacity modification to the switching system 2a if VP capacity modification is possible. The switching system 2a which has received admission of VP capacity modification indicates, by means of an OAM cell having the same VP number as the VP which performs capacity modification, modification of the VP capacity to a cross connect located in the passing route of the VP.

Figure 3:
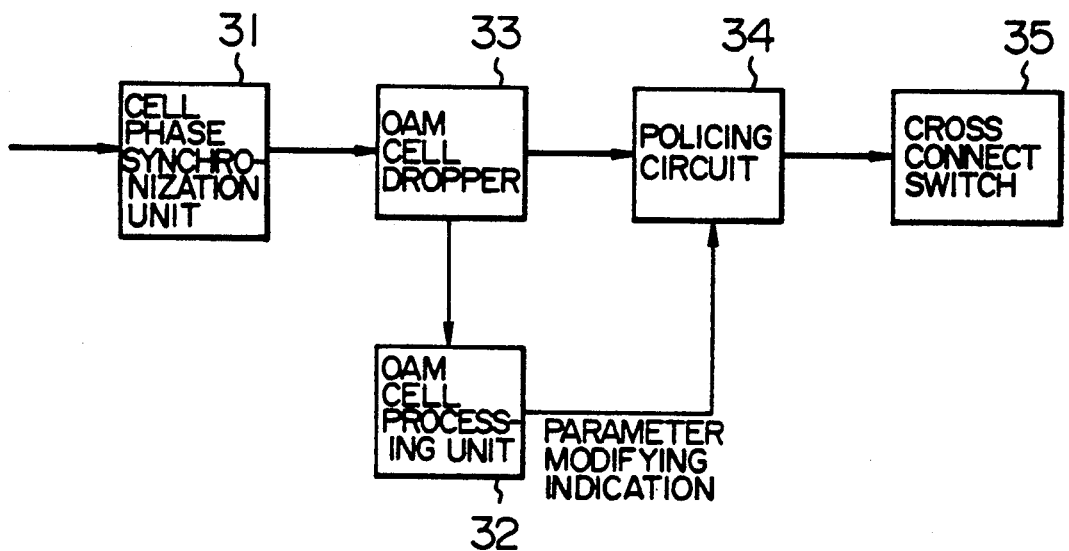
FIG. 3 is a block diagram illustrating a construction of a cross connect on a VP according to the fundamental embodiment.

FIG. 3 is a diagram showing a construction of a cross connect on a VP. As to a cell stream received at a cross connect, a phase of a cell is synchronized with a clock inside the cross connect by means of a cell phase synchronization unit 31. For the synchronized cell stream an OAM cell is dropped by means of an OAM cell dropper 33. The contents of the dropped OAM cell are interpreted by an OAM cell processing unit 32, and the contents are notified to a policing circuit 34. The policing circuit 34 modifies a regulation parameter on the VP capacity based on the notified contents. A VP cell stream which has been applied with regulation is inputted to a cross connect switch 35.

FIGS. 4A and 4B shows flow charts showing the operation of the policing circuit 34. In this method, the time interval for processing one cell is divided into the first half portion and the second half portion, and a received cell is processed in the first half portion. Periodic renewal of a parameter or setting modification of a regulation parameter is performed in the second half portion.

In this method, a count value C and a time stamp Tb showing the last cell receiving time or periodic renewal time are used as parameters showing the VP use status corresponding to a received VP identifier (hereinafter referred to as VPI), and an increment value i and a decrement value d are used as regulation parameters. A policing characteristic may be changed with the values of regulation parameters (i, d). These parameters are notified from the OAM cell processing unit 32.

At the time of receiving a cell, that which is obtained by subtracting the time stamp value Tb from the current time Tp, adding the value which is increased by i times to C, and subtracting d therefrom is adopted as a count value at the time of reception (steps 401, 402). When this value falls between a count value Cmin at the start of regulation and the maximum count value Cmax, the processing is terminated (steps 403, 404). In case that C becomes larger than Cmax, C=Cmax is set (step 405). Further, in case that C becomes smaller than the Cmin, C=Cmin is set, and the cell is sent out to the cross connect switch 35 with a violation tag VT attached thereto, (steps 406, 407). The cell attached with the violation tag VT is rejected with priority when cell rejection is required in accordance with the inside congestion status.

Periodic renewal of the count value is performed in the second half of one cell cycle. The VPI which performs periodic renewal is selected in the period of N cells, and that which is obtained by subtracting the time stamp value Tb from the current time Tp and adding the value which is increased by i times to C. In case that C exceeds Cmax, C=Cmax is set (steps 408-412).

When the VPI is in a set mode in the second half of one cell cycle, new values of i and d are entered in a table (steps 413, 414). Namely, the contents notified from the OAM cell processing unit 32 are set in the policing circuit with this timing.

Figure 5:
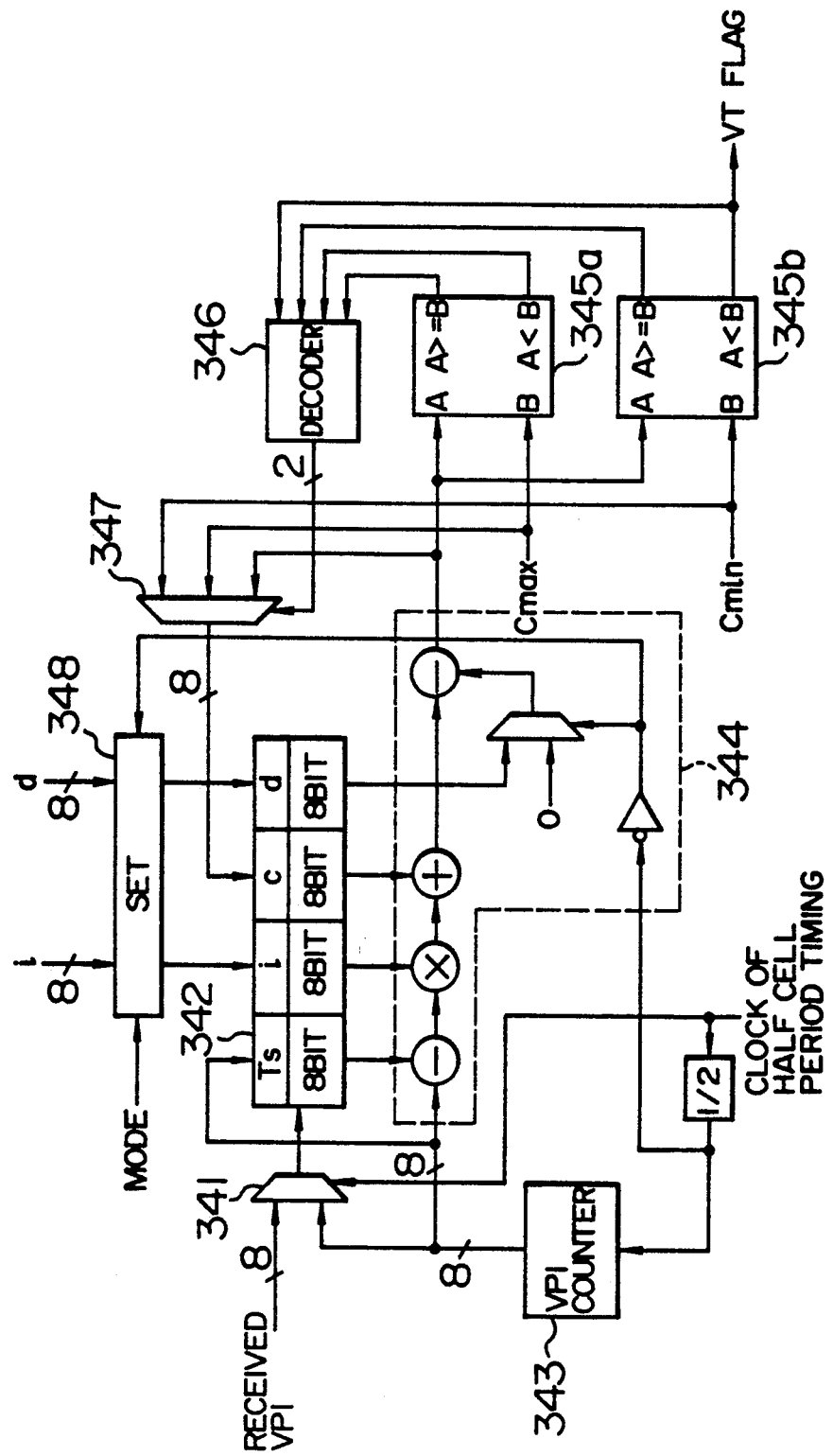
FIG. 5 is a circuit diagram illustrating a construction example of the policing circuit.

FIG. 5 shows a construction example of the policing circuit. In this circuit configuration, the first half cycle and the second half cycle are created by demultiplying the frequency of a clock of half cell period timing in two. A VPI counter 343 creates VPI values in consecutive order in the period of N cells, thus giving the timing of periodic renewal and setting. A selector 341 selects in every half cell period timing with which of a received VPI and a VPI counter accesses as a table memory 342. An operation circuit 344 performs operation shown in FIG. 4 by using the contents of the memory 342. A value Tb of a time stamp is created by utilizing the value of the VPI counter 343. Furthermore, the result of operation is compared with Cmax and Cmin by means of comparators 345a and 345b, and a decoder 346 determines information for renewal of the memory 342 based on the result of the comparison.

The information to be stored in the memory 342 is changed over with a mode change-over circuit 348 at the time of changing over parameters.

A feature of a method of the present embodiment is that it is possible to modify a VP capacity only by notifying policing parameters.

Figure 6:
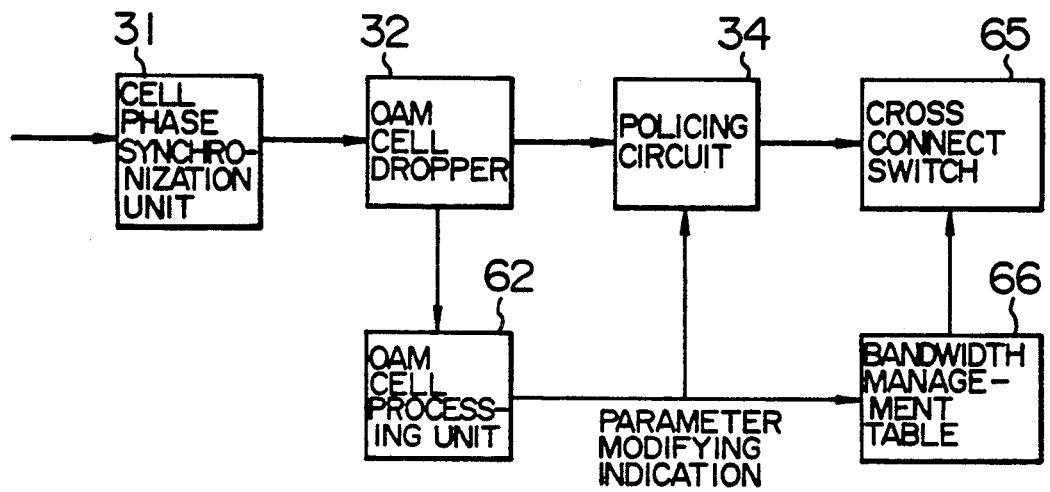
FIG. 6 is a block diagram illustrating another embodiment of the present invention.

FIG. 6 is a diagram showing another embodiment of the present invention. In this embodiment, a traffic shaping function 66 is added to a cross connect switch, and parameter modifying indication is also notified to the bandwidth management table. The parameters in this case are a VPI number and an allocated bandwidth thereof or output time slot allocation.

A feature of the method of the present invention is that a traffic load for a cross connect at the next stage may be uniformed because allocated bandwidth are regulated.

Figure 7:
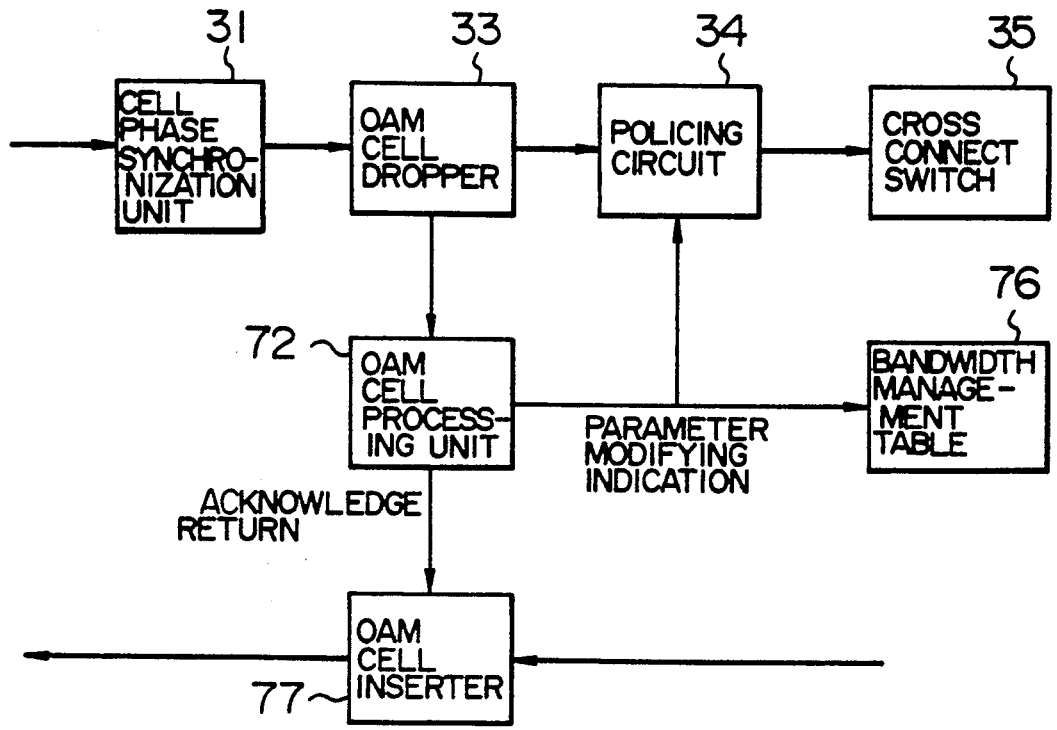
FIG. 7 is a block diagram illustrating still another embodiment of the present invention.

FIG. 7 is a diagram showing another embodiment of the present invention. In the present embodiment, an acknowledgment cell which notifies that VP capacity modifying indication has been received is returned. In this case, an OAM cell having a return VPI designated value contained in the received OAM cell as a VPI is sent out in a reverse direction in an OAM cell processor. The return designated VPI value is transferred to a latter stage after being converted link by link by means of respective cross connects.

A feature of a method of the present invention is that reliability is high because it is possible to confirm that normal values have been set in all the cross connects in modification of a VP capacity.

Figure 8:
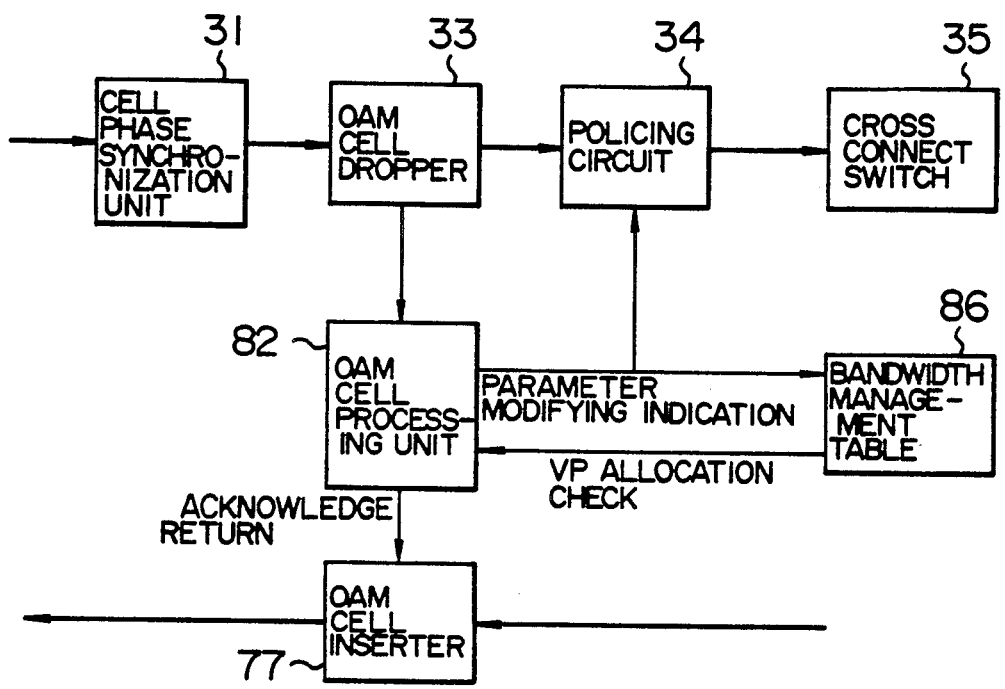
FIG. 8 is a block diagram illustrating a further embodiment of the present invention.

FIG. 8 is a diagram showing another embodiment of the present invention. In the present embodiment, it is checked whether a modified VP capacity notified with an OAM cell matches with a physical capacity of a transmission line, and the check result is returned with an acknowledgment cell.

A feature of the method of the present embodiment is that reliability is high because a set value is not only confirmed, but also the correctness thereof is verified independently at respective cross connects.

Figure 9:
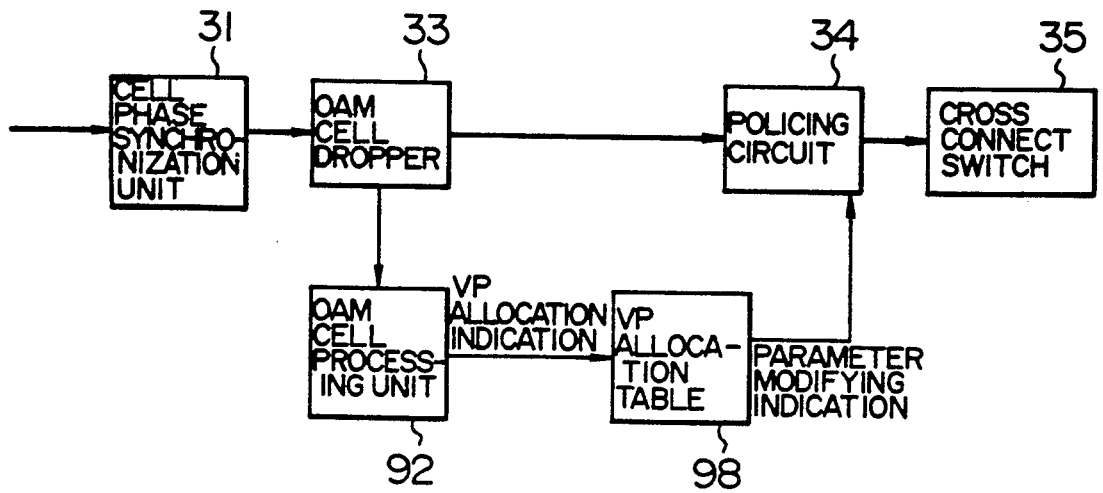
FIG. 9 is a block diagram illustrating a still further embodiment of the present invention.

FIG. 9 is a diagram showing another embodiment of the present invention. In the present embodiment, the capacity of each individual VP is not modified one by one, but change-over indicating information of the virtual path setting tables held by respective cross connects is sent out, thereby to modify a plurality of VP's with one OAM cell.

According to the method of the present invention, it is possible to modify a plurality of VP capacities with one OAM cell. Hence, a feature of the method is that the modification process are simplified.

A case of notifying VP modifying information from a switching system has been described in all of above-described embodiments. However, a similar method is also applicable to case of notification from the VP management system.

As described in the embodiments above, according to the method of the present invention, such an effect is produced that it is possible to notify of VP capacity modification covering even several ten nodes by only one OAM cell.

We claim:
1. A method of modifying a virtual path capacity in a communication network which transfers a first cell in an asynchronous transfer mode between node apparatuses, said first cell having a first virtual path identifier indicative of a virtual path which said first cell passes through, comprising the step of:
modifying a bandwidth allocated to the virtual path;
wherein said step of modifying includes the step of notifying the modification of the bandwidth to a node apparatus included in said virtual path by passing a second cell through said virtual path, said second cell having information of the modification and a second virtual path identifier same as said first virtual path identifier.

2. A method of modifying a virtual path capacity according to claim 1, further comprising the steps of:
receiving said second cell by said node apparatus; and
returning a third cell having information of confirmation of reception of said second cell by said node apparatus.

3. A method of modifying a virtual path capacity according to claim 2, wherein said third cell has a third virtual path identifier indicative of a virtual path which said third cell passes through, said second cell further has information indicative of said third virtual path identifier, said node apparatus which receives said second cell designates said third virtual path identifier when said third cell is returned.

4. A method of modifying a virtual path capacity according to claim 2, further comprising the steps of:
   determining normality of the modification notified to said node apparatus based on a physical capacity of a transmission line corresponding to said virtual path; and
   returning a fourth cell having information of a result of the determination.

5. A method of modifying a virtual path capacity according to claim 1, further comprising the steps of:
   processing said first cell by said node apparatus; and
   processing said second cell by said node apparatus;
   wherein said step of processing said first cell and said step of processing said second cell are performed in a scheduled manner within a transfer time for one of said first cell and said second cell.

6. A method of modifying a virtual path capacity according to claim 1, further comprising the step of processing said first cell by said node apparatus, wherein said step of processing said first cell includes the step of detecting, by said node apparatus, abnormality of traffic characteristics of a cell stream caused by said first cell received by said node apparatus based on a bandwidth being allocated to said virtual path.

7. A method of modifying a virtual path capacity according to claim 1, further comprising the step of processing said first cell by said node apparatus, wherein said step of processing said first cell includes the step of performing traffic shaping as to said first cell by said node apparatus.

8. A method of modifying a virtual path capacities in a communication network which transfers a first cell and a second cell in an asynchronous transfer mode between node apparatuses, said first cell having a first virtual path identifier indicative of a first virtual path which said first cell passes through, said second cell having a second virtual path identifier indicative of a second virtual path which said second cell passes through, said first and second virtual paths being set in the same route, comprising the step of:
   modifying first and second bandwidths respectively allocated to said first and second virtual paths;
   wherein said step of modifying includes the step of notifying modification of the bandwidths to a node apparatus included in said route by passing a third cell through said first virtual path.

9. A method of modifying a virtual path capacity in a communication network which transfers a first cell in an asynchronous transfer mode between node apparatuses, said first cell having a first virtual path identifier indicative of a virtual path which said first cell passes through, comprising the steps of:
   modifying the bandwidth allocated to said virtual path, wherein said step of modifying includes the step of notifying modification of the and width to a plurality of node apparatuses included in said virtual path by passing a second cell through said virtual path, said second cell having information of the modification and a second virtual path identifier same as said first virtual path identifier;
   receiving said second cell by said second node apparatus; and
   returning from each node apparatus a third cell having information of confirmation of reception of said second cell by said node apparatus;
   wherein said third cell has a third virtual path identifier indicative of a virtual path which said third cell passes through, said second cell further has information indicative of said third virtual path identifier, one of said plurality of node apparatuses which has received said second cell designates said third virtual path identifier when said third cell is transferred from said one of said plurality of node apparatuses to another of said plurality of node apparatuses.

* * * * *